J. PIEPER.
AUTO TIRE RIM CLAMP.
APPLICATION FILED NOV. 20, 1918.

1,320,913.

Patented Nov. 4, 1919.

Witnesses
John Ernst.
F. L. Horspool.

Inventor
John Pieper

UNITED STATES PATENT OFFICE.

JOHN PIEPER, OF SALT LAKE CITY, UTAH.

AUTO-TIRE-RIM CLAMP.

1,320,913.  Specification of Letters Patent.  Patented Nov. 4, 1919.

Application filed November 20, 1918. Serial No. 263,435.

*To all whom it may concern:*

Be it known that I, JOHN PIEPER, a citizen of the United States, and a resident of Salt Lake City, in the county of Salt Lake and State of Utah, have invented a new and useful Improvement in Auto-Tire-Rim Clamps, of which the following is a specification.

One object of my invention is to provide an auto tire rim clamp that is cheap in construction and durable in service.

Another object of my invention is to provide a U shape auto tire rim clamp that is not to be taken off from the felly of the wheel when the auto tire rim is being removed.

Another object of my invention is to provide a U shape auto tire rim clamp that can be applied to an auto wheel in such a manner so that the rim can be applied from either side of the wheel when off the auto.

Another object of my invention is to provide a U-shaped auto tire rim clamp so as to fit and operate over the felly, felly band and auto tire rim so that it will lock the auto tire rim firmly onto the felly.

With these and other objects in view my invention consists of the following parts, reference being had to the annexed drawings forming part of this specification and to the letters and numerals marked thereon.

Similar letters and numerals refer to like parts throughout the drawings.

Figure 1:
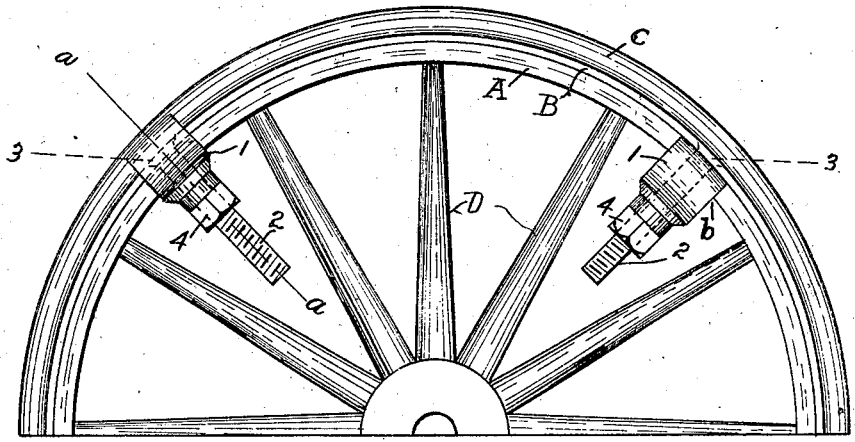
Figure 1, is a half view of an auto wheel showing the invention at *a—a* in a locked position and showing it unlocked at *b*.
Figure 2:
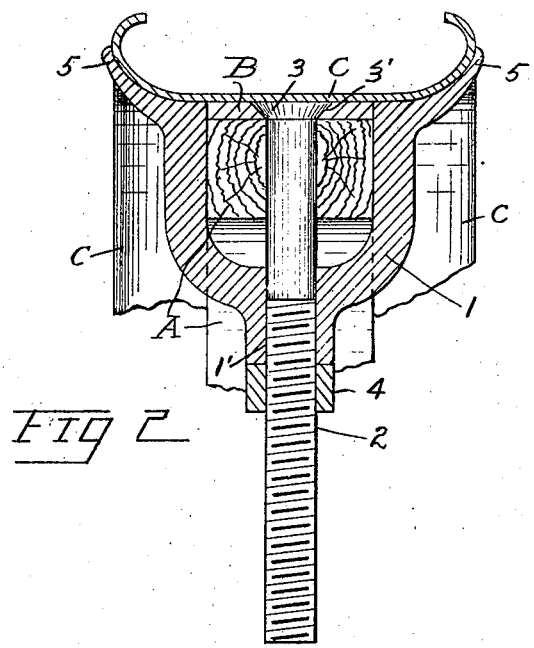
Fig. 2 is an enlarged section through *a—a* Fig. 1, showing the invention in a locked position.

A, denotes the felly of the auto wheel, B, the felly band, C, the tire rim for holding the auto tire, D, the spokes, 1, the U shaped clamp for holding the auto rim C on the felly, 2 the bolt, 3 the head of the bolt, 4 the nut, 5 contact of the U shaped clamp with the auto tire rim. Each leg of the said U-shaped clamp 1 has a portion formed as a heel 7, with another portion extended as a foot, shown at 5. The said foot portion 5 of one leg coacts with the foot portion 5 of the other leg to grip the tire rim C.

In applying the invention to an auto wheel, a hole 3′ is drilled through the felly band and felly, the hole in the felly band being counter-sunk to receive the head 3 of the bolt 2. After placing the bolt 2 through the hole 3′; by screwing up the nut 4 the said clamp 1 will be forced radially outward and the heels 7 will contact with the tire rim C and space said rim from the felly band B, and at the same time the foot portions 5 will grip the said felly band and prevent any lateral displacement of said tire rim. When a number of said clamps have been likewise placed in position and the nuts 4 turned up the tire rim will be concentrically spaced from the felly band and firmly held on the wheel.

In removing the rim from the felly band of a wheel, loosen all of the nuts 4 until the clamps 1 are in the position shown at *b* in Fig. 1 this will allow the tire rim to be removed from the wheel in either direction, and none of the nuts 4 need be removed from the bolts 2. I have thus provided an improved automobile tire rim clamp consisting of a new and novel clamp having outwardly forcing heel portions and coacting foot portions and held in place with a bolt and nut accessible from either side of the wheel.

Having thus described my invention, what I claim and desire to secure by Letters Patent, is:

An auto tire rim clamp comprising the tire rim of an auto; a felly band having countersunk holes therein; bolts passed through said holes and having heads formed thereon to fit said holes; U-shaped clamps carried on said bolts having opposed leg portions adapted to pass radially the edges of said felly band adjacent the holes therein; a heel portion of each leg adapted to press against the inner face of said tire rim; a foot portion of each clamp adapted to engage the edge of said tire rim to true said rim on said band; and nuts screwed on said bolts to force said heel portions of said clamps radially outward and at the same time hold said rim in fixed relation to said felly band.

JOHN PIEPER.

Witnesses:
JOHN ERNST,
J. M. THOMAS.